United States Patent

[11] 3,612,305

| [72] | Inventor | Alvin Wasserman<br>1521 Charrington Drive, Birmingham,<br>Mich. 48010 |
|---|---|---|
| [21] | Appl. No. | 833,303 |
| [22] | Filed | June 16, 1969 |
| [45] | Patented | Oct. 12, 1971 |

[54] LOADING DOCK STRUCTURE AND SMALL GOODS HANDLING SYSTEM
7 Claims, 2 Drawing Figs.

[52] U.S. Cl. ........................................... 214/16 B,
209/125, 214/38 R
[51] Int. Cl. ........................................... B65g 1/00
[50] Field of Search ........................................... 214/38,
38.2, 38.22, 38.8, 16 B; 209/125

[56] References Cited
UNITED STATES PATENTS
1,261,504  4/1918  Fitch ........................... 214/16 B 2,096,958  10/1937  Clerc ........................... 214/16 B
2,487,613  11/1949  Stone ........................... 214/38.22 UX
3,027,023  3/1962  McGrath ........................... 214/16 B Primary Examiner—Robert G. Sheridan
Attorney—Hauke, Krass, Gifford and Patalidis ABSTRACT: A small goods handling and distribution system for a trunk line terminal for over-the-road hauling carriers including a loading dock conveyor in the form of an endless belt or chain extending directly through an opening in the loading dock surface to provide a means for conveying small goods and packages to a lower level of a warehouse or terminal for sorting and distribution of the small goods according to delivery zones and immediate dispatch to respective zone carriers parked at the same terminal.

INVENTOR
ALVIN WASSERMAN
BY Hauke, Krass, Gifford, & Patalidis
ATTORNEYS

LOADING DOCK STRUCTURE AND SMALL GOODS HANDLING SYSTEM

BACKGROUND OF THE INVENTION

I. Field Of The Invention

The present invention relates to material handling systems, and more in particular to a conveyor and distribution means to transfer small articles or goods directly from a mixed goods carrying vehicle to a designated zone carrier vehicle.

II. Description Of The Prior Art

Cargo loading or unloading devices for warehouses, terminals or the like to transfer cargo from a loading dock or from a carrier vehicle parked at the warehouse or terminal into the warehouse or terminal to a certain designated transfer area, or vice versa to transfer cargo from the transfer area in the warehouse or terminal to the loading dock or to a carrier vehicle are known in the art.

Warehouses, terminals, storage depots, magazines or the like buildings which are used for storage, handling, transfer and shipping of transient goods generally have one or more floor levels, some of which may be below the level of the loading dock. Conventional practice has been to transfer goods destined for different points of destination to the several different zone areas by means of hoists running between the floors, by inclined ramps connecting the several floor levels inside the warehouse, or be gravity chutes, if goods are to be disposed in the lower floor areas or by lift trucks or the like if the goods stay on the main floor. All of these arrangements require a large amount of manual handling of the goods, that is, the goods have to be transferred from the carrier vehicle onto the loading dock into the warehouse or terminal and to a particular conveyance for transportation to the respective zone area for further delivery. This arrangement requires excessive man-hours and a relatively large number of workers to handle the distribution of the goods since the goods have to be handled from the carrier vehicle onto the loading dock of the warehouse or terminal from which they have to be loaded on carts, lift trucks or the like, for transport into the warehouse or directly to the respective zone carrier vehicles. Obviously, this handling method is time consuming and, for faster handling of the operation, a greater number or workers has to be employed.

Warehouse or terminal conveyor systems for more efficient handling of the goods, some of which having extensions reaching out to and beyond the loading docks for unloading of goods from the carrier vehicle directly onto the conveyor, or for direct loading of the carrier vehicle are known in the art. These systems, however, are highly elaborate and costly and none provide transfer of the goods directly through the loading dock to a lower floor level of the warehouse or terminal for sorting and distribution of the goods to several different zone areas.

Prior to the present invention, the unloading of goods at a trunk line terminal from a bulk carrier vehicle was time consuming due to the presence of a large amount of small goods, such as packages and the like, destined for different points of destination which in the past had to be put aside on the loading dock to enable the larger goods to be loaded on hand or power driven trucks for transport into the terminal or to the respective zone carriers. Frequently, the put-aside smaller goods would get in the way of the unloading operation, and in general, seriously hampered the unloading and transfer of the goods unless they were gathered together in containers, such as pallets or the like, for transportation by truck into the terminal, for later sorting and distribution according to their points of destination.

It is known in trunk line over-the-road hauling operations that goods to be shipped to various points of destination are picked up by a bulk carrier vehicle from a port warehouse, railroad terminal or the like for transfer to an over-the-road trunk line terminal where the goods are sorted and transferred to respective directional zone carriers or temporarily stored in the respective zone areas within the terminal. The goods involved are usually of various size, shape and weight and in most instances include a large amount of small goods such as packages and the like destined for various geographical locations. The bulk carrier vehicle picking up these goods carries them to the trunk line terminal where the goods are unloaded for transfer to their point of designation. As mentioned before, the large amount of small goods destined for different points of destinations normally hamper the transfer of the goods and thus cause an unwarranted delay in delivery of these goods. Conventionally the small goods as they come to hand during unloading of the bulk carrier vehicle are usually put aside on the loading dock for later sorting and distribution to their point of destination whereas the larger goods can easily and quickly be carried into the terminal or directly to their respective zone carrier.

The primary object of the present invention is the provision of novel sorting and distribution means to eliminate the foregoing difficulties.

SUMMARY OF THE INVENTION

The present invention provides a highly efficient loading dock-to-terminal conveyor system for transferring relatively small-sized goods directly and quickly from the bulk carrier down through the loading dock into the terminal for distribution of the goods to certain area zones for other trunk carriers.

In the present arrangement, the novel conveyor means extends beneath the loading dock and communicates directly with the surface of the loading dock by means of an opening therethrough, and then extends angularly downwardly into the terminal from beneath the loading dock for conveyance of the small goods to a lower floor level. The conveyor opens flush with the surface of the loading dock and occupies very little space therein so that it does not interfere with the normal unloading of larger items. These can be moved along the loading dock and directly to the ground floor of the terminal or to the waiting zone carrier vehicle.

By this arrangement, a highly efficient goods handling and transfer system has been provided which assures quick transfer of relatively small sized goods between the bulk carrier vehicle and the terminal area, disposed at a floor level below the level of the loading dock to thereby considerably reduce the required man-hours for any given good handling and transfer operation.

By means of the following detailed description, further obvious advantages will become apparent or will be specifically pointed out.

BRIEF DESCRIPTION OF THE DRAWINGS

The accompanying drawings illustrate schematically a preferred embodiment of the loading dock structure of the present invention in which.

DESCRIPTION OF THE PREFERRED EMBODIMENT

Figure 1:
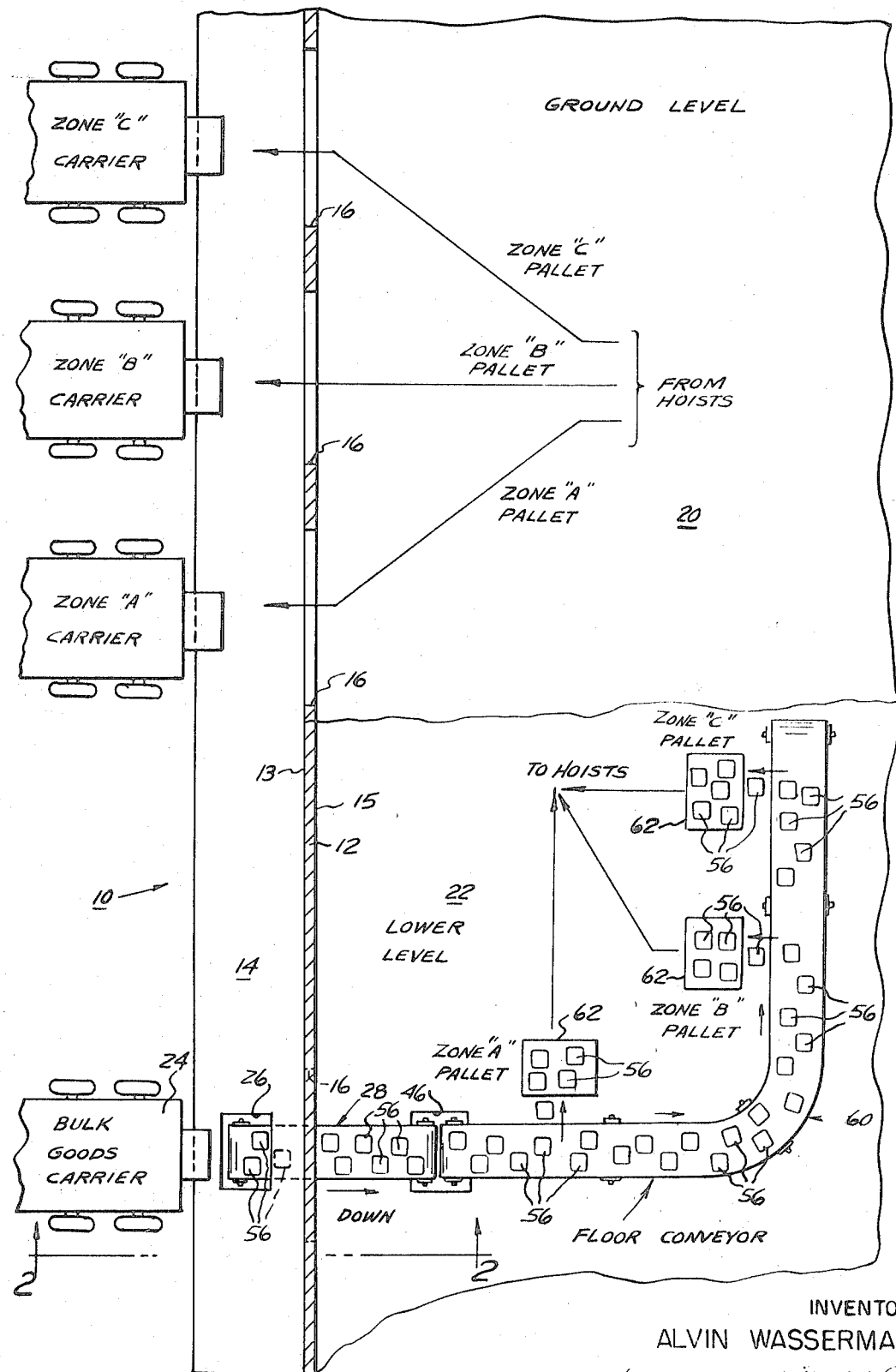
FIG. 1 represents a schematic cross-sectional plan view of a trunk line terminal embodying the present improved small goods handling system.

With references to FIG. 1 there is schematically illustrated a terminal 10 having a sidewall 12 from which extends a loading dock 14. The wall 12 is provided with several door openings 16 to provide egress into or exit from the terminal 10. Normally, the openings 16 are provided to move goods out of or into the terminal 10. The terminal is provided with a ground floor 20 substantially level with the loading dock 14 and a lower level floor 22 disposed below the level of the loading dock 14.

A bulk carrier vehicle 24 is parked at the loading dock 14 loaded with a mixed consignment of goods to be unloaded and sorted within the terminal 10 according to their destination.

Normally, most of the larger and heavier goods are carried from the bulk carrier vehicle by carts or lift truck to designated storage areas or directly to the respective waiting zone carrier vehicle ≠A," "B," "C," etc. parked at the terminal a distance away from the bulk carrier vehicle 24 for delivery of the goods to their point of destination.

The bulk carrier 24, however, carries a large amount of small goods for delivery to various points of destinations which normally can not be quickly sorted out as they come to hand during unloading of the bulk carrier. Thus, in conventional practice these small goods are usually placed aside on the loading dock for later sorting after unloading of the larger and heavier goods and, as mentioned before, frequently obstruct the normal unloading of the bulk carrier.

According to the present invention the loading dock 14 at the location where the bulk carrier 24 is parked is provided with an opening 26 into which a conveyor 28 extends which moves downwardly beneath the loading dock onto the lower floor level 22 adapted to receive all the small goods from the bulk carrier 24 which can not be immediately sorted out so as to prevent their being placed on the loading dock and hamper the loading operation.

Figure 2:
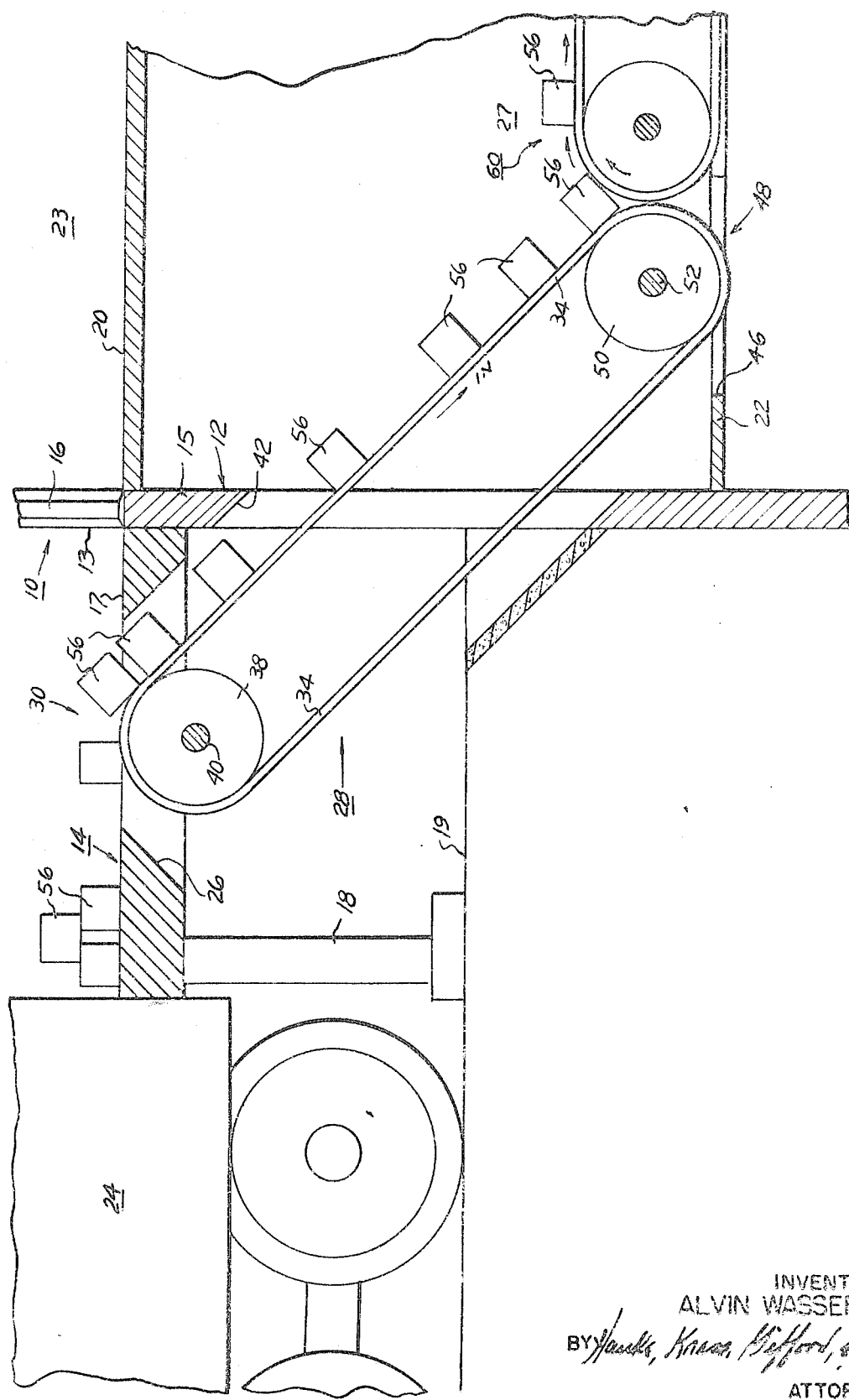
FIG. 2 is a cross-sectional view through the terminal and loading dock illustrating the present novel loading dock conveyor more in detail.

With reference to FIG. 2 which shows a cross section of the terminal generally indicated at 10, 12 comprises the wall having an outer surface 13 from which extends a loading dock 14, the outer end of which is supported by means of posts or pillars 18 on the ground 19 outside of the terminal. Floors at different levels indicated, for instance, at 20 and 22 extend from the inner surface 15 of the wall 12 at spaced height levels to provide goods transfer areas 23 and 27, respectively. The ground floor 20 may be considered the main floor of the terminal, which is normally substantially level with the surface 17 of the loading dock 14 to facilitate the transfer of goods from the loading dock into the terminal through appropriate door openings 16 in the wall 12 for disposition of the larger and heavier goods at designated zone storage areas on the main floor, or direct transfer to the waiting zone carrier vehicles "A," "B," "C," etc. (FIG. 1).

The loading dock 14 is provided with an opening 26 adjacent the door opening 16 extending form the surfaces 17 downwardly through the loading dock to accommodate the partial extension therethrough of the upper end 30 of a conveyor 28, comprising an endless belt, chain or the like 34 which normally is provided with a friction surface for retainment of the goods placed thereon. The upper end of the conveyor extends around a pulley or sprocket 38 positioned for rotation on a shaft 40, which is suitably supported in any known fashion onto and preferably immediately underneath the loading dock 14 so that the surface of the belt or chain 34 of the conveyor is substantially flush with the surface 17 of the loading dock.

The conveyor 28 extends angularly downwardly towards the wall 12 of the warehouse and through an opening 42 in the wall into the warehouse to the lower floor level 22. For purposes of description, an opening 46 is provided in the lower floor 22 to permit the extension of the lower end 48 of the conveyor therethrough. The lower end 48 of he conveyor 28 comprises a pulley or sprocket 50 around which the belt or chain 34 is guided, and which is positioned for rotation on a shaft 52 suitable supported on the floor 22 of the terminal in any convenient desirable manner, as dictated by the particular installation requirement.

The conveyor 28, during the unloading operation, is driven by any known means (not shown) such as an electric motor or the like, the direction of which may be reversible so as to selectively permit the conveyor to convey goods into the terminal as well as out of it.

For operation of the unloading device and assuming a bulk carrier vehicle 24 is backed against the front of the loading dock 14 to unload its goods, the larger goods will be transported in conventional manner by means of hand or power driven carts or trucks (not shown) from the bulk carrier vehicle through the terminal door 16 onto the main floor 20 for disposal at designated zone areas or directly along the loading dock 14 to the respective waiting zone carrier vehicle "A," "B," "C," etc. (FIG. 1). Whereas, the small goods, indicated at 56, instead of being put aside on the loading dock are placed onto the continuously running conveyor 28, which transports them downwardly through the opening 26 in the loading dock and through the opening 42 in the wall 12 of the terminal into the sorting hand distribution area 27 of the lower floor level 22. The small goods or packages 56 designated for this area will be dropped onto a horizontal conveyor 60 (FIG. 1) disposed on the lower floor.

Since the upper end of the conveyor 28 is substantially flush with the surfaces 17 of the loading dock 14, the relatively small sized goods 56, which consist of cartons, packages, parcels of the like, can be easily and continuously placed onto the conveyor and, in particular instances, only one workman is needed to unload the bulk carrier vehicle 24 by continuously loading the conveyor 28 for transfer of the smaller goods to the lower floor 22.

Referring back to FIG. 1, the small goods 56 as they are transferred down from the loading dock 14 onto the lower floor level 22 of the terminal they are dropped onto a horizontal floor conveyor 60 which runs for a considerable distance along or around the floor of the lower level at relatively slow speeds. At certain spaced points along the conveyor pallets 62 or the like are being placed each of which is destined for a certain area location designated Zone "A," "B," "C," etc. A number of workmen (not shown) along the floor conveyor 60 continuously remove the packages, cartons or other small goods 56 from the conveyor and place them according to their area destination into the respective zone pallets 62. Whenever a pallet 62 gets filled up it is removed by lift truck or the like (not shown) to a hoist mechanism (not shown) to transfer the pallet from the lower level to the ground floor 23.

Thus, the bulk carrier 24 having brought goods of mixed sizes and weights destined for various locations to the trunk line terminal 10 is unloaded by transferring the larger goods by carts, lift trucks or the like directly along the loading dock 14 to the respective waiting zone carriers "A," "B," "C," etc., which simultaneously are loaded with goods for the respective areas previously sorted on the ground floor of the terminal.

After all the larger goods have been loaded into the respective zone carriers the smaller goods 56 which in the meantime have been sorted out of the floor as described above and placed in the respective zone pallets and brought up to the ground floor will be loaded on their pallets into the respective zone carriers so as not to be mixed with the larger goods already on the carriers for quick unloading of the carriers at their points of destination.

Thus, the unloading and immediate sorting and distribution of the mixed goods from the bulk carrier vehicle 24 is being accomplished efficiently and quickly without undue delay at the terminal usually caused by the larger number of small goods destined for various points of destinations and which normally would hamper the unloading and goods transfer operation when put aside on the loading dock for later sorting and distribution.

By the provision of the present novel loading dock conveyor the small goods are continuously transferred out of the way of the unloading operation into the terminal for quick sorting of the small goods and immediate transfer to the respective zone carriers at the same time as the larger goods are unloaded and transferred from the bulk carrier so that there will be no delay in the transfer and distribution of the goods at the terminal.

Preferably, the loading dock opening 26 may be provided with a cover (not shown) to be closed when the conveyor is not in operation, and, similarly, the pillars or posts 18 supporting the outer end of the building dock may be replaced by a solid wall to prevent unauthorized access into the terminal through the conveyor wall opening 42.

From the foregoing, it will be seen that by the present invention an effective small goods handling and distribution system has been provided for a trunk line terminal having two floor levels and a loading dock.

The present system is relatively simple, inexpensive and requires considerably fewer man-hours for any particular loading or unloading operation than present conventional unloading methods.

I claim:

1. A trunk line goods receiving and distributing system comprising:
   a trunk line terminal;
   a first floor within said terminal;
   a second floor below said first floor;
   a loading dock substantially level with said first floor;
   at least one goods receiving station along said loading dock;
   a plurality of loading stations along said loading dock;
   zone carrier vehicles parked at said loading stations adapted to receive goods destined for different points of destination;
   a down conveyor extending through said loading dock into said terminal to said second floor;
   a length of floor conveyor on said second floor continuing said down conveyor;
   said down conveyor being adapted to transfer relatively small goods from a bulk carrier vehicle parked at said goods receiving station to said second floor of said terminal and onto said floor conveyor for sorting and distribution of said small goods according to their destination; and
   means transporting said sorted goods back up to said first floor for loading into a respective one of said zone carrier vehicles parked at said loading stations.

2. The trunk line system as defined in claim 1, in which said bulk carrier vehicle is adapted to deliver goods of various sizes, weights and points of destinations to said terminal for transfer and distribution of said goods into said zone carrier vehicles, the system comprising transferring goods of relatively small size into said terminal to said second floor by means of said down conveyor for sorting of the goods according to their points of destination.

3. The trunk line system as defined in claim 1, in which said goods of relatively small size are sorted as they travel along said floor conveyor on said second floor for disposition onto pallets and transfer of the pallets back up to said first floor for loading into respective ones of said zone carrier vehicles.

4. A loading dock structure for a terminal or the like having a main floor and a lower floor comprising in combination: a loading dock supported exteriorly of said terminal for extension away therefrom; an opening in said loading dock; and conveyor means comprising an endless belt disposed between said loading dock and said lower floor, said conveyor means extending from said opening in said loading dock into said terminal and to said lower floor for transfer of articles form said loading dock into said terminal and directly onto said lower floor, said endless belt of said conveyor means being disposed so that the portion adjacent said opening is substantially flush with the upper surface of said loading dock.

5. The loading dock structure as defined in claim 4, said loading dock being substantially level with said main floor, an outside wall intermediate said loading dock and said main floor, a door provided in said outside wall for access from said loading dock onto said main floor, said conveyor means being disposed adjacent said door.

6. In combination; a terminal having a plurality of goods transfer areas, spaced at different levels, said terminal comprising a main means, and a lower floor underneath said main floor; a loading dock outside of said terminal and substantially level with said main floor; and conveyor means between said loading dock and said lower floor to selectively convey articles from said loading dock to said lower floor, said conveyor means comprising an endless belt having an upper return portion extending through said loading dock to be substantially flush with the surface of said of said loading dock, said endless belt extending angularly downwardly through a wall of said terminal to said lower floor inside said terminal.

7. The combination as defined in claim 6, further comprising door means within the wall of said terminal for access from said loading dock onto said main floor of said terminal, said conveyor means being disposed adjacent said door means.